United States Patent Office 3,544,520
Patented Dec. 1, 1970

3,544,520
LUBRICANT ADDITIVES FROM FORMALDEHYDE-POLYALKYLENE POLYAMINE OXIDIZED OLEFIN POLYMER CONDENSATION PRODUCTS
George S. Culbertson, Whiting, Ind., and Edmund J. Piasek, Chicago, Ill., assignors to Standard Oil Company, Chicago, Ill., a corporation of Indiana
No Drawing. Filed Apr. 22, 1968, Ser. No. 723,303
Int. Cl. C08d 5/02; C08f 27/00; C08g 9/00
U.S. Cl. 260—72  5 Claims

ABSTRACT OF THE DISCLOSURE

Ashless dispersants are produced by subjecting a polymer such as a polybutene or polypropylene to oxidation in the presence of a catalyst such as manganous carbonate and the oxidation product is then condensed with formaldehyde and a polyalkylene polyamide.

BACKGROUND OF THE INVENTION

Lubricant deterioration in high speed engines causes the formation of lacquer, sludge and carbon deposits on the interior surfaces of the engines which accelerates wear and reduces efficiency. Today, more than ever before, the requirements for lubricants in high speed engines are more stringent, consequently, additives are necessary to combat the formation of deleterious substances.

The continuing search for and the necessity of having readily available superior ashless dispersants as additives to motor oils are well known. Since the development of the positive crankcase ventilation system (PCV) there exists a greater demand than ever for improved ashless dispersant additives because the PCV systems place substantially greater burdens upon the motor oil and the additives included therein. Accordingly, applicants have developed improved ashless dispersant additives for motor oils which tend to prevent the agglomeration of sludge and the deposition of varnish and sludge caused by the formation of the products of deterioration. The dispersants of this invention provide surprising and superior results as additives in motor oils.

This invention provides a new compositions of matter which are useful as dispersants for lubricating oil compositions. These novel dispersant additives exhibit the desired solubility in the oil and the desired compatibility with other oil-included functional additives.

The prior art exemplifies patents such as U.S. Pat. No. 2,982,728 issued May 2, 1961, to Whitney, which apparently concerns the oxidation of polypropylene and polyisobutylene using catalysts such as naphthenate salts wherein the oxidized product is neutralized with barium oxide in contrast to the instant novel subject matter of this invention. Nothing in the known prior art appears to anticipate nor render obvious this invention.

SUMMARY OF THE INVENTION

This invention relates to new ashless dispersants. The invention particularly concerns new ashless dispersants produced from olefin polymers.

Olefin polymers suitably employed in this invention have molecular weights within the range of from about 200 to about 2,000 no. mol. wt. The most suitable polymers utilized in this invention are obtained by polymerizing butenes and propylenes. Specifically, oxidation of the olefin polymer is effectuated by heating the polymers at a temperature within the range of from about 250° F. to about 350° F. in the presence of manganous carbonate in amounts ranging from about 0.1% to about 5.0%. The oxidation of the olefin polymers during the aforesaid heating with manganous carbonate is carried out by blowing the mixture with an oxygen-containing gas at a rate within the range of about 1.0 cubic feet per hour to about 2.0 cubic feet per hour for each 1,000 grams of the particular polymer.

During a time increment ranging from about 10 hours to about 20 hours, 70% to 90% of the particular polymer has been oxidized. The oxidized polymer after blowing with the oxygen-containing gas at the incremental volumetric rate for the aforementioned time period can have an oxygen content within the range of from about 5% to about 7%. Inspection of the oxidized polymer by infrared and nuclear magnetic resonance techniques indicate that substantially all of the oxygen therein is present in ketonic structures.

Typical dispersants and smoke inhibitors have been produced by the application of heat to various polymers, the heat ranging from about 270° F. to about 320° F. in the presence of about 1% powdered manganous carbonate. During the heating of these mixtures, oxygen-containing gas was blown through the mixtures at a volumetric rate within the range of from about 1.3 cubic feet per hour to about 1.5 cubic feet per hour per each 1,000 grams of the particular polymer. Within 10 to 20 hours, the conversion was from about 70% to about 90% of the oxidized polymer. The data taken is shown on the following Table I.

It should be noted from the data in Table I that a substantial amount of oxygen has been incorporated in the polymer without degradation of polymer molecular weight.

TABLE I
[Polymer oxidation with air in presence of 1% MnCO₃]

| Polymer | Molecular weight | Temperature control (F.) | Air rate c.f.h. per 1,000/g. poly | Run time (hrs.) | Percent of polymer oxidation | Prod. mol. wt. | Prod. O₂ (percent) |
|---|---|---|---|---|---|---|---|
| (1) Polymer light overhead | 300 | 270 | 1.3 | 20 | 86 | 297 | 14.5 |
| (2) Polybutene | 320 | 300 | 1.3 | 16 | 67 | 355 | 5.4 |
| (3) Polybutene | 2,000 | 320 | 1.3 | 20 | 90 | 1,262 | 4.0 |
| (3a) Polybutene | 2,000 | 320 | 1.5 | 10 | 89 | | |
| (4) Polypropylene | 550 | 300 | 1.3 | 20 | 73 | 505 | 7.7 |
| (5) Polypropylene | 1,100 | 300 | 1.3 | 20 | 85 | 981 | 5.0 |

In the production of the ashless dispersants of this invention, the oxidized polymers are condensed with formaldehyde and a polyalkylene polyamine such as tetraethylene pentamine. In a typical example, an oxidized polybutene having a product molecular weight of about 1,250 is taken in an amount of about 100 grams (0.05 mol) and heated to about 190° F. with tetraethylene pentamine in an amount of about 8.8 grams (0.046 mol) dissolved in about 50 cubic centimeters of benzene added dropwise during a period of from about 2 hours to about 2½ hours. About 12 grams (0.16 mol) of an aqueous (36%) formaldehyde is added in three lots during the amine addition period. After all of the reagents have been added, the temperature of the mixture is raised to about 300° F. and held at that level for about two hours. A commercially available SAE-5 oil (50 grams) is added and the product is filtered through a filter aid such as Celite. The deep red, bright product was analyzed and showed 0.7% nitrogen content corresponding to about 37% yield and 25% active for the 1:1 polymer-tetraethylene pentamine product.

The effectiveness of the dispersants of this invention are demonstrated by the Spot Dispersancy Test.

SPOT DISPERSANCY TEST

The dispersancy test is conducted by mixing 2% by weight based on the oil weight of the additive to be tested into a measured volume of crankcase lubricant oil formulation which has been used in a Lincoln Sequence V engine test for 394 hours (twice the time of the standard test time). This composition is heated and stirred at about 300° F. for about 16 hours and an aliquot is transferred to blotting paper. A control is made at the same time by stirring and heating at 300° F. for 16 hours a second volume of used oil from the 394 hour Lincoln Sequence V engine test and depositing an aliquot on blotting paper. At the same time, a readily available commercial ashless dispersant is mixed in the same manner as above for comparison purposes. The deposits on the blotting paper are measured to obtain the average diameter of the outer oil ring (Do) and the average diameter of the inner sludge ring (Da). The ratio of $Da/Do$ is an indication of the detergent-dispersant property of the addition agent. These ratios and the sludge settling tests are shown in Table II.

Table II below compares the dispersancy properties of the dispersants of the invention with a widely used commercial ashless dispersant.

Table II

| Additive: | Percent dispersancy |
|---|---|
| Preparation above | 88 |
| Commercial ashless dispersant | 66 |
| Oil with no dispersant | 43 |

In the above tests both the dispersant of the invention and the commercial dispersant were tested at a level of 2% by weight base on oil weight active dispersant in the test oil. It is evident from the data from the table above that the dispersant of the invention is highly effective and superior to commercially available products.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

Having described the invention, what is claimed is:

1. The product prepared by condensing formaldehyde, a polyalkylene polyamine, and an oxidized olefin polymer prepared by heating at about 250–350° F. an olefin polymer having a molecular weight of about 200–2,000 in the presence of oxygen and a catalytically active amount of manganous carbonate, said formaldehyde, polyamine, and oxidized olefin polymer being reacted in the mole ratios of about 3:1:1, respectively.

2. The product defined in claim 1 wherein said manganous carbonate is present in an amount ranging from about 0.1% to about 5.0%.

3. The product defined in claim 1 wherein the oxygen is supplied by blowing the mixture with an oxygen-containing gas at a rate within the range of from about 1.0 to about 2.0 cubic feet per hour per 1,000 grams of polymer.

4. The product defined in claim 1 wherein the olefin polymer is either polybutene or polypropylene.

5. The product prepared by condensing formaldehyde, a polyalkylene polyamine, and an oxidized polypropylene or polybutene olymer prepared by heating said polymer at about 250–300° F. for about 10–20 hours in the presence of about 0.1–5.0% manganous carbonate while blowing into said mixture gas containing about 5–7% oxygen at a rate of about 1.0–2.0 cubic feet per hour per 1,000 grams of polymer.

References Cited

UNITED STATES PATENTS

| | | | |
|---|---|---|---|
| 2,924,572 | 2/1960 | Lawrence et al. | 252—51.5 |
| 3,121,690 | 2/1964 | Berger et al. | 252—51.5 |
| 3,392,118 | 7/1968 | Isaacson et al. | 252—51.5 |
| 3,420,735 | 3/1967 | Conte et al. | 260—72 |
| 3,262,989 | 7/1966 | Brignac | 260—28 |
| 2,982,728 | 5/1961 | Whitney | 252—39 |
| 3,418,066 | 12/1968 | Caldwell et al. | 260—94.9 |

FOREIGN PATENTS

| | | |
|---|---|---|
| 262,107 | 4/1929 | Great Britain. |
| 269,840 | 1/1928 | Great Britain. |
| 976,365 | 11/1964 | Great Britain. |

WILLIAM H. SHORT, Primary Examiner

E. D. WOODBERRY, Assistant Examiner

U.S. Cl. X.R.

252—51.5; 260—28, 854